United States Patent Office 3,689,480
Patented Sept. 5, 1972

3,689,480
PHOSPHANILIC ACID DERIVATIVES
Burton G. Christensen, Scotch Plains, N.J., and William J. Leanza, Staten Island, N.Y., assignors to Merck & Co., Inc., Rahway, N.J.
No Drawing. Continuation-in-part of application Ser. No. 612,800, Jan. 31, 1967. This application Aug. 5, 1969, Ser. No. 847,730
Int. Cl. C07d 51/44; A61k 27/00
U.S. Cl. 260—239.75                    4 Claims

ABSTRACT OF THE DISCLOSURE

Fluoro substituted phosphanilic amides are produced by the reduction of the corresponding fluoro-nitrobenzenephosphonamide. The nitrobenzenephosphonamides may be prepared from the phosphonic dihalide by reaction of the dihalide with an amine. The phosphonic dihalide may be prepared from the corresponding fluoro-substituted phosphonic acid by reaction with a halogenating agent. The fluoro-phosphanilic amides are useful as anti-bacterial agents.

---

This invention relates to novel phosphanilic acid derivatives. Specifically, this invention is concerned with fluoro-substituted phosphanilic amide compounds which are useful as antibacterial agents.

This application is a continuation-in-part of copending application U.S. Ser. No. 612,800, filed Jan. 31, 1967 now abandoned.

Phosphanilic acid has been synthesized (inter alia Doak et al. JACS 74 (1952)) and found to be active against *L. plantarium* (Kuhn et al., Ber. 75, 711 (1942)), *E. coli* (Klotz et al., JACS 69, 473 (1947)), *C. diphtheriae, Sh. dysenteriae, Ps. fluorescens, S. typhosa, K. pneumoniae, Br. bronchiseptica* and *D. pneumoniae* (Thayer et al., Antibiotics and Chemotherapy, 3, 256 (1953)). However, several substituted benzene phosphonic acids, including phosphanilic acid and nuclearly substituted phosphanilic acids (including 2-chlorophosphanilic acid) have been prepared and tested, in vitro, against *T. pallidum* (the syphilis organisms) but found inactive although certain nitro- and substituted nitrobenzene phosphonic acids do show in vitro activity against this organism (Doak et al. Antibiotics and Chemotherapy 8, 346 (1958)).

A general method for the synthesis of substituted benzene phosphonic acids is disclosed by Doak et al. (JACS 73, 5658 (1951)).

In accordance with this invention, there is disclosed compounds and processes of preparing compounds having the structural formula:

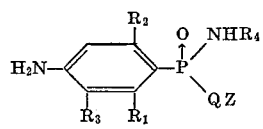

wherein $R_1$, $R_2$, and $R_3$ are hydrogen or fluoro; at least one of which is fluoro.

Q is O or NH;
$R_4$ is hydrogen, loweralkyl, phenyl, loweralkylamino, phenyl amino or 4-(2-heterocyclosulfamoyl)phenyl and the alkali metal salts thereof and
Z is hydrogen, loweralkyl, 4-(2-heterocyclosulfamoyl) phenyl and the alkali metal salts thereof and where Q is O, Z may be an alkali metal.

These compounds are prepared by reducing the corresponding fluoro-containing nitrobenzenephosphonamide to the desired phosphanilic amide.

These compounds are useful against a variety of bacteria, in particular, *Salmonella schottmuelleri*.

In the principal embodiments of the invention, a fluoro-containing nitrobenzenephosphonamide is reduced to the corresponding phosphanilic amide. The fluoronitrobenzenephosphonamide may be prepared from the corresponding phosphonic dihalide which is then converted to the desired amide by reaction with an amine. The phosphonic dihalide may be prepared from the corresponding fluoronitro phosphonic acid by reaction with a halogenating agent.

In other embodiments of this invention, the nitrobenzenephosphonic amides thus produced may be converted into other amido derivatives by means which will appear herein below. These compounds then being similarly reduced to the corresponding phosphanilic amido derivatives.

In the principal embodiment of the present invention, the phosphonic acid dihalide, for example 2-fluoro-4-nitrobenzenephosphonic dichloride or dibromide is prepared by reacting the corresponding phosphonic acid with a halogenating agent, such as phosphorus pentachloride or phosphorus pentabromide. Where the aromatic nucleus carries the 3-fluoro or 2,6-difluoro substituents, the corresponding substituted nitrobenzenephosphonic acid may be prepared according to procedures which are our invention, together with our colleague Rasmusson, and are disclosed in U.S. Pat. 3,442,938. The amido compounds are prepared by reacting the fluoro-nitrobenzenephosphonic dihalide, suitably the dichloride with the desired amine, for example a lower-alkylamine such as ethylamine, propylamine, or butylamine, or an aromatic amine such as aniline or substituted derivatives thereof, such as nitraniline, methoxyaniline, or chloroaniline, also included are sulfamoylanilines, especially heterocyclosulfamoyl anilines such as sulfadiazine, sulfaisoxazola, sulfathiazine and sulfamerazine. This reaction may be carried out in any suitable organic solvent, bromobenzene, chloroform or pyridine being among the solvents of choice. An excess of at least 2 moles of amine, that is to say, at least 4 moles of amine per mole of dihalide is preferred except where pyridine is used as the solvent or the reaction is carried out with ortho phenylenediamine. The reaction is carried out in a temperature range of from about 0° C. to the reflux temperature of the solvent depending upon the reactivity and the volatility of the amine employed. Upon completion of the reaction, the solvent is removed under reduced pressure, the residue washed with water and recrystallized from a suitable solvent, for example from chloroform.

In a modification of this embodiment, the thus formed phosphondiamide may be converted to the corresponding phosphonamidic acid or the metal salts thereof. In this modification, the phosphondiamide, for example 2-fluoro-4-nitrobenzene phosphondianilide is taken up in a water miscible organic solvent, suitably an ether such as dioxane and heated with exactly one equivalent of an aqueous solution of a suitable base, for example, an alkali metal hydroxide such as sodium hydroxide for from about 1 to about 3 hours. It is desirable to add small amounts of water at, say, 15 minute intervals during the reaction until the amount of water added is approximately equal to the amount of solvent originally used. The solvents are removed under reduced pressure and the residue extracted with water from which the sodium salt of the corresponding phosphonamidic acid, for example sodium N-phenyl-P-(2'-fluoro - 4' - nitrobenzene) phosphonamidate may be isolated.

Included among the compounds which may be produced by this method are:

sodium N-[4-(pyrimidinyl sulfamoyl)phenyl]-P-(4'-fluoro-4'-nitrobenzene)phosphonamidate,
sodium N-[4-(methyl pyrimidinyl sulfamoyl)phenyl]-P-(2'-fluoro-4'-nitrobenzene)phosphonamidate,
sodium N-[4-(dimethyl pyrimidinyl sulfamoyl)phenyl]-P-(2'-fluoro-4'-nitrobenzene)phosphonamidate,
sodium N-[4-(thiazolyl sulfamoyl)phenyl]-P-(2'-fluoro-4'-nitrobenzene)phosphonamidate,
sodium N-[4-(quinoxalinyl sulfamoyl)phenyl]-P-(2'-fluoro-4'-nitrobenzene)phosphonamidate,
sodium N-[4-(dimethyl isoxazole sulfamoyl)phenyl]-P-(2'-fluoro-4'-nitrobenzene)phosphonamidate, and the alkali metal salts thereof.

The corresponding aminobenzene derivative is then obtained by reduction according to one of the procedures outlined hereinbelow.

In another modification of this procedure, the fluoronitrobenzenephosphonic dihalide is reacted with a lower alkylene diamine, such as ethylene diamine, propylene diamine or butylene diamine. In this reaction, a solution of the dihalide in a suitable organic solvent, for example, an ether, such as dioxane is added dropwise to an exactly equimolar amount of the diamine in a similar solvent. The reaction is carried out at ambient temperature and is complete after a period of from about one to about three hours. The reaction mixture is then cooled to from about 0° C. to about 5° C., filtered and the filtrate evaporated to give a solid residue which is then washed with a weak aqueous base, aqueous sodium bicarbonate being especially suitable; the residue extracted with acetone, washed with water and recrystallized from a loweralkanol, suitably methanol, to give the corresponding N-aminoalkyl - P - (2 - fluoro - 4 - nitrobenzene)phosphonamidic acid in the form of its internal salt.

This phosphonamidic acid is reduced to the corresponding 4 - aminobenzenephosphonamidic acid by procedures to be described hereinbelow.

In yet another modification of the invention o-phenylene diamine or the nuclearly substituted derivatives thereof is reacted with the fluoronitrobenzenephosphonic dihalide in a moderately high boiling inert organic solvent. While the choice of solvent is not critical, it is desired to utilize a solvent having a reflux temperature high enough to dissociate the amine hydrohalides formed in the course of the reaction and low enough not to decompose the amides formed. Secondly, it is preferred to utilize a solvent in which the amides have a substantially lower solubility in the cold than in the hot, thus simplifying the isolation of the reaction product. Thirdly, it is desired to utilize a solvent wherein hydrohalic acids are not very soluble. These criteria for a solvent are best satisfied by bromobenzene. However, any solvent which will satisfy most of these criteria may be used.

In a further modification of this embodiment, the diazaphosphole ring may be cleaved, for example by alkanolysis, suitably methanolysis to yield the corresponding alkyl - N - (2 - aminophenyl) - P - (2'-fluoro-4' - nitrobenzene)phosphonamidate. Similarly, by use of other alkanols, such as ethanol, propanol or butanol, the corresponding ethyl, propyl or butyl derivative may be obtained in place of the methyl derivative.

In this procedure, the diazaphosphole is taken up in a large excess of an alkanol, suitably loweralkanol, say methanol or ethanol, and heated under reflux from one to about 3 hours. Concentration of the solution yields the desired alkyl derivative as a crystalline precipitate. This alkyl derivative may be readily converted into the metal salt, suitably the alkali metal salt of the corresponding phosphonamidic acid, by reaction with a metallic base. It is preferred to produce the alkali metal salts by reaction with the corresponding alkali hydroxide, such as sodium or potassium hydroxide to produce the corresponding sodium or potassium salt.

In the preferred mode, the alkyl phosphonamidate is dissolved in a water miscible organic solvent and ether, such as dioxane or tetrahydrofuran being suitable, and heated under reflux in the presence of an equivalent amount of aqueous alkali. The product is then isolated. In the preferred isolation procedure, the reaction mixture is evaporated to dryness, stirred with water, filtered and the pure product precipitated from the filtrate by the addition of a loweralkanol, suitably ethanol.

Where it is desired to produce the free acid, the aqueous solution of the metal salt is treated with a small excess, say from 5 to 15% of aqueous mineral acid, suitably N-hydrochloric acid, whereby the free acid is precipitated and isolated either by centrifuging or filtration, depending on the grain size of the precipitated phosphonamidic acid.

However, it is not intended to limit the scope of this invention merely to the alkali metal salts, it being possible to produce the corresponding derivatives from other metallic bases.

All of the aforementioned nitrobenzene derivatives may be reduced to the corresponding amino phenyl phosphonamides or phosphonamidates by means of the reduction procedures disclosed hereinbelow.

In the preferred procedure, this reduction is carried out by hydrogenation, suitably in the presence of a catalyst. Among the catalysts which may be employed are palladium, platinum oxide and Raney nickel, the noble metal catalysts being used either per se or adsorbed on a suitable carrier and the hydrogenation carried out under mildly acid conditions, say pH 4–6, while where Raney nickel is used mildly basic conditions, i.e. pH 7–9 are applicable. The nitrobenzenephosphonamide is taken up in a suitable solvent such as a loweralkanol, preferably methanol or ethanol or in a water miscible ether such as dioxane, the catalyst added and the hydrogenation carried out at a temperature of between 15° C. and 35° C. at a pressure of between 20 and 60 pounds per sq. inch. The hydrogenation mixture is then filtered and the product isolated by evaporation of the filtrate.

The following examples are given for the purpose of illustration and not by way of limitation.

EXAMPLE 1

A mixture of 4.4 g. of 2 - fluoro-4-nitrobenzenephosphonic acid and 4 g. of phosphorus pentachloride are heated on the steam bath until the reaction subsides. The phosphorus oxychloride thus formed is distilled off under reduced pressure. The 2 - fluoro - 4 - nitrobenzenephosphonyl dichloride is distilled over at a temperature of about 180° C. and an estimated 1 mm. pressure.

EXAMPLE 2

To 100 ml. of a solution of 12.8 g. (0.05 mole) of 2 - fluoro - 4 - nitrobenzenephosphonic dichloride in 10 ml. of bromobenzene are added dropwise with vigorous stirring at 15° C. a solution of 5.4 g. of o-phenylenediamine in 200 ml. of bromobenzene over 15 minutes. A white precipitate is formed immediately. The mixture is then heated for 30 minutes at reflux. Hydrogen chloride is evolved and the solid dissolves in the refluxing bromobenzene. The reaction mixture is cooled and 1,3-dihydro-2-(2'-fluoro-4'-nitrobenzene) - 2 - H - 1,3,2 - benzodiazaphosphole - 2 - oxide is given as a crystalline precipitate which is separated by suction filtration, washed with bromobenzene, petroleum ether and dried.

In accordance with the above procedure but starting with the corresponding 2,6 - difluoro - 4 - nitrobenzenephosphonic dichloride or 3 - fluoro - 4 - nitro-benzenephosphonic dichloride, there is obtained the corresponding 1,3 - dihydro - 2 - (2' - 6' - difluoro - 4' - nitrobenzene)-2 - H - 1,3,2 - benzodiazaphosphole - 2 - oxide or 1,3-dihydro - 2 - (3' - fluoro - 4' - nitrobenzene) - 2 - H - 1,3,2-benzodiazaphosphole-2-oxide.

EXAMPLE 3

600 mg. of 1,3 - dihydro - 2 - (2' - fluoro - 4' - nitrobenzene) - 2 - H - 1,3,2-benzodiazaphosphole - 2 - oxide are suspended in 25 ml. of dioxane in the presence of 300 mg. of 5% palladium charcoal and hydrogenated at a pressure of 40 lb. per sq. inch at 25° C. On completion of the hydrogenation, the reaction mixture is diluted with a further 250 ml. of dioxane, stirred for 3 hours, filtered and the product isolated from the solution by concentration to yield 1,3 - dihydro - 2 - (2' - fluoro - 4' - aminobenzene) - 2 - H - 1,3,2 - benzodiazaphosphole - 2 - oxide.

EXAMPLE 4

6 g. of 1,3 - dihydro - 2 - (2' - fluoro - 4' - nitrobenzene) - 2 - H - 1,3,2 - benzodiazaphosphole - 2 - oxide are taken up in 200 ml. of methanol and heated for 5 hours under reflux. The reaction mixture is cooled and the solvent removed under reduced pressure to yield crystalline methyl N-(2-aminophenyl) - P - (2' - fluoro - 4' - nitrobenzene)phosphonamidate.

In accordance with the above procedure but using ethanol, propanol or butanol in place of methanol, there is obtained the corresponding ethyl N-(2-aminophenyl)-P-(2' - fluoro - 4' - nitrobenzene)phosphonamidate, propyl N - (2 - aminophenyl) - P - (2' - fluoro - 4' - nitrobenzene)phosphonamidate and butyl N - (2 - aminophenyl)-P - (2' - fluoro - 4' - nitrobenzene)phosphonamidate.

EXAMPLE 5

900 mg. of methyl N - (2 - aminophenyl) - P - (2'-fluoro - 4' - nitrobenzene)phosphonamidate is suspended in 25 ml. of methanol in the presence of 400 mg. of Raney nickel and hydrogenated at a pressure of 40 lb. per sq. in. On completion of the hydrogenation, the reaction mixture is filtered, the filtrate evaporated and the residue recrystallized from methanol to give methyl N-(2-aminophenyl) - P - (2' - fluoro - 4' - aminobenzene)phosphonamidate.

In accordance with the above procedure but starting with ethyl N - (2 - aminophenyl) - P - (2' - fluoro - 4'-nitrobenzene) - phosphonamidate, butyl N - (2 - aminophenyl) - P - (2' - fluoro - 4' - nitrobenzene)-phosphonamidate, or propyl N - (2 - aminophenyl) - P - (2'-fluoro-4' - nitrobenzene)phosphonamidate in place of methyl N-(2-aminophenyl) - P - (2' - fluoro - 4' - nitrobenzene) phosphonamidate, there is obtained the corresponding alkyl N - (2 - aminophenyl) - P - (2' - fluoro-4'-aminobenzene) phosphonamidate.

EXAMPLE 6

1.5 g. of methyl N-(2-aminophenyl)-P-(2'-fluoro-4'-nitrobenzene)phosphonamidate are heated in 20 ml. of dioxane with 5 ml. of 2 N aqueous sodium hydroxide for 10 minutes. The solution is evaporated to dryness under reduced pressure, the residue stirred with water and filtered. The filtrate is concentrated to circa 2 ml. and 10 ml. of ethanol added to yield yellow needles of sodium N-(2-aminophenyl) - P - (2'-fluoro-4'-nitrobenzene)phosphonamidate hydrate.

EXAMPLE 7

2.5 g. of sodium N-(2-aminophenyl)-P-2'-fluoro-4'-nitrobenzene)phosphonamidate are taken up in 50 ml. of 80% aqueous methanol and hydrogenated at 40 p.s.i. in the presence of 2 g. of Raney nickel. After hydrogenation, the reaction mixture is filtered, the filtrate evaporated to dryness, taken up in water and ethanol added to precipitate sodium N-(2-aminophenyl)-P-(2'-fluoro-4'-aminobenzene)phosphonamidate.

250 mg. of this sodium salt are dissolved in 2 ml. of water and cooled to 5° C. and 0.8 ml. of N HCl is added to precipitate N-(2-aminophenyl)-P-(2'-fluoro-4'-aminobenzene)phosphonamidic acid.

EXAMPLE 8

0.5 g. (8.4 mmole) of ethylenediamine are dissolved in 15 ml. of dioxane to which is added dropwise 1.07 g. (4.2 mmole) of 3-fluoro-4-nitrobenzenephosphonic dichloride in 10 ml. of dioxane. The addition is carried out with vigorous stirring during a period of one hour. The reaction mixture is then kept for 12 hours at 5° C., filtered and the filtrate evaporated to give a light yellow powder which is washed with aqueous sodium bicarbonate, extracted with acetone, washed with water and recrystallized from methanol to yield N-(2-aminoethyl)-P-(3'-fluoro-4'-nitrobenzene)phosphonamidic acid (internal salt).

In accordance with the above procedure but using 1,2-diaminopropane and 1,2-diaminobutane in place of ethylene diamine, there is obtained the corresponding internal salt of N-(2-aminopropyl)-P-(3'-fluoro-4'-nitrobenzene) phosphonamidic acid and N-(2-aminobutyl)-P-(3'-fluoro-4'-nitrobenzene) phosphonamidic acid.

EXAMPLE 9

200 mg. of N-(2-aminoethyl)-P-(3'-fluoro-4'-nitrobenzene) phosphonamidic acid are dissolved in 25 ml. of methanol and hydrogenated in the presence of 0.5 gm. of Raney nickel at 40 lb. per sq. in. After hydrogenation, the reaction mixture is filtered and the filtrate evaporated to yield N-(2-aminoethyl)-P-(3'-fluoro-4'-aminobenzene) phosphonamidic acid.

In accordance with the above procedure but starting with N-aminopropyl-(3'-fluoro-4'-nitrobenzene phosphonamidic acid and N-aminobutyl-P-(3'-fluoro-4'-nitrobenzene)phosphonamidic acid in place of N-aminoethyl-(3'-fluoro-4'-nitrobenzene)phosphonamidic acid, there is obtained the corresponding N-aminoalkyl-P-(3'-fluoro-4'-aminobenzene)phosphonamidic acid.

EXAMPLE 10

3.4 g. of 2-fluoro-4-nitrobenzenephosphondianilide are heated for 2 hours in 15 ml. of dioxane containing 4 ml. of 2.5 N aqueous sodium hydroxide during which time 5 ml. of water are added, each 15 minutes until a total of 20 ml. of water have been added. The solvents are removed under reduced pressure and the residue stirred with water and removed from the unreacted starting material by filtration. The filtrate is heated with charcoal, filtered, concentrated to circa 10 ml., and cooled in an ice bath to yield sodium N-phenyl-P-(2'-fluoro-4'-nitrobenzene) phosphonamidate as a crystalline precipitate.

EXAMPLE 11

2 g. of sodium N-phenyl-P-(2'-fluoro-4'-nitrobenzene phosphonamidate are taken up in 30 ml. of water and hydrogenated at 40 p.s.i. in the presence of 1 g. of Raney nickel for 3½ hours. The hydrogenation mixture is filtered and the filtrate evaporated to yield a syrup which crystallizes on the addition of dioxane to yield sodium N-phenyl-P - (2'-fluoro-4'-aminobenzene)phosphonamidate hemihydrate.

EXAMPLE 12

10 g. of sulfadiazine and 5 g. of 2-fluoro-4-nitrobenzene phosphonyl dichloride are taken up in 30 ml. of pyridine and heated for 15 minutes at 100° C. The hot solution is then poured into 200 ml. of water and the precipitate filtered, washed with water and triturated with hot 90% aqueous acetone to yield N,N'-bis-[4-(2-pyrimidinylsulfamoyl)phenyl]-P-(2' - fluoro - 4' - nitrobenzene)phosphonamide.

3 g. of the bis phenyl phosphonamide are taken up in 18 ml. of N-aqueous sodium hydroxide and heated at 80° C. for 1½ hours. 100 ml. of water are added, followed by 11 ml. of N aqueous acetic acid. After 2 hours, the precipitate of sulfadiazine is removed by filtration, an additional 2 ml. of acetic acid added and the solution cooled to 0° C. for 3 hours. The thus produced precipitate is separated by filtration and air-dried to yield sodium N-[4-(2-pyrimidinylsulfamoyl)phenyl] - P - (2'-fluoro-4'-nitrobenzene)phosphonamidate.

450 mg. of the sodium salt are dissolved in 20 ml. of water and 1 ml. of N aqueous sodium hydroxide was added. 0.2 g. of Raney nickel are added and the mixture hydrogenated at 40 p.s.i. for 2 hours. The catalyst is separated by filtration and the filtrate evaporated under reduced pressure until crystallization is noted. Ethanol is then added to yield disodium N-[4-(2-pyrimidinyl-sulfamoyl)phenyl] - P - (2' - fluoro-4'-aminobenzene)phosphonamidate.

The sodium salt is dissolved in cold water and treated with acetic acid to give a precipitate of N-[4-(2-pyrimidinylsulfamoyl)phenyl] - P - 2' - fluoro-4'-aminobenzene)-phosphonamidic acid.

In accordance with the above procedure but using sulfamerizine, sulfamethazine, sulfathiazole, sulfaquinoxaline, and sulfisoxazole in place of sulfadiazine, there is obtained N-[4-(methyl-2-pyrimidinylsulfamoyl)phenyl]-P-(2'-fluoro-4'-aminobenzene)phosphonamidic acid,
N-[4-(dimethyl-2-pyrimidinylsulfamoyl)phenyl]-P-(2'-fluoro-4'-aminobenzene)phosphonamidic acid,
N-[4'-(2-thiazolyl sulfamoyl)phenyl]-P-2'-fluoro-4'-aminobenzene)phosphonamidic acid,
N-[4-(2-quinoxalinylsulfamoyl)phenyl]-P-(2'-fluoro-4'-aminobenzene)phosphonamidic acid and
N-[4-(dimethyl isoxazolylsulfamoyl)phenyl]-P-(2'-fluoro-4'-aminobenzene)phosphonamidic acid.

EXAMPLE 13

To 100 ml. of a solution of chloroform saturated with methylamine at 0° C. is added slowly 3 gms. of 2-fluoro-4-nitrobenzenephosphonic dichloride to give a clear solution which is evaporated to dryness under reduced pressure. The residue is washed with water and the undissolved residue recrystallized from chloroform to give N,N'-dimethyl-P-(2'-fluoro-4'-nitrobenzene)phosphondiamide.

In accordance with the above procedure but using 2-fluoro-4-nitrobenzenephosphonic dibromide in place of the dichloride the same product is obtained.

Similarly, but using ethylamine, butylamine or propylamine in place of methylamine, there is obtained the corresponding N,N'-diethyl-P-(2'-fluoro-4'-nitrobenzene)phosphondiamide,
N,N'-dibutyl-P-(2'-fluoro-4'-nitrobenzene)phosphondiamide, and
N,N'-dipropyl-P-(2'-fluoro-4'-nitrobenzene)phosphondiamide.

EXAMPLE 14

575 mg. of N,N'-dimethyl-P-(2'-fluoro-4'-nitrobenzene)phosphonamide is dissolved in 25 ml. of methanol and hydrogenated in the presence of 200 mg. of Raney nickel at a pressure 40 lb. per sq. in. After hydrogenation, the reaction mixture is filtered, concentrated, triturated with ether to give a solid residue which on recrystallization from ethanol gives N,N'-dimethyl-P-(2'-fluoro-4'-aminobenzene)phosphonamide.

In accordance with the above procedure but starting with the corresponding N,N'-diethyl, N,N'-dipropyl and N,N'-dibutyl-P-(2'-fluoro - 4' - nitrobenzene)phosphonamides in place of N,N'-dimethyl-P-(2'-fluoro-4'-nitrobenzene)phosphonamide, there is obtained the corresponding N,N'-dialkyl-P-(2'-fluoro-4'-aminobenzene)phosphonamide.

EXAMPLE 15

A mixture of 4.4 g. of 3-fluoro-4-nitrobenzenephosphonic acid and 4 g. of phosphorus pentachloride are heated on the steam bath until the reaction subsides. The phosphorus oxychloride that is formed in the reaction is distilled off under reduced pressure. The 3-fluoro-4-nitrobenzenephosphonyl dichloride is distilled over at a reduced pressure.

EXAMPLE 16

10 g. of sulfadiazine and 5 g. of 3-fluoro-4-nitrobenzene phosphonyl dichloride are taken up in 30 ml. of pyridine and heated for 15 minutes at 100° C. The hot solution is then poured into 200 ml. of water and the precipitate filtered, washed with water and triturated with hot 90% aqueous acetone to yield N,N'-bis-[4-(2-pyrimidinylsulfamoyl)phenyl]-P-(3' - fluoro-4'-nitrobenzene)phosphonamide.

2.9 g. of the bis phenyl phosphonamide are taken up in 18 ml. of N-aqueous sodium hydroxide and heated at 80° C. for 1½ hours. 100 ml. of water are added, followed by 11 ml. of N aqueous acetic acid. After 2 hours, the precipitate of sulfadiazine is removed by filtration, and additional 2 ml. of acetic acid added and the solution cooled to 0° C. for 3 hours. The thus produced precipitate is separated by filtration and air-dried to yield sodium N-[4-(2-pyrimidinylsulfamoyl)phenyl]-P - 3' - fluoro-4'-nitrobenzene)-phosphonamidate.

457 mg. of the sodium salt are dissolved in 20 ml. of water and 1 ml. of N aqueous sodium hydroxide was added. 0.2 g. of Raney nickel are added and the mixture hydrogenated at 40 p.s.i. for 2 hours. The catalyst is separated by filtration and the filtrate evaporated under reduced pressure until crystallization is noted. Ethanol is then added to yield disodium N-[4-(2-pyrimidinylsulfamoyl)phenyl]-P-(3' - fluoro-4'-aminobenzene)phosphonamidate.

The sodium salt is dissolved in cold water and treated with acetic acid to give a precipitate of N-[4-(2-pyrimidinylsulfamoyl)phenyl]-P-(3' - fluoro - 4' - aminobenzene)-phosphonamidic acid.

EXAMPLE 17

A mixture of 5.0 g. of 2,6-difluoro-4-nitrobenzenephosphonic acid and 4.5 g. phosphorus pentachloride are heated on a steam bath until the reaction subsides. The phosphorus oxychloride formed during the reaction is distilled off under reduced pressure. The 2,6-difluoronitrobenzenephosphonyl dichloride is distilled over at elevated temperature and at reduced pressure.

EXAMPLE 18

To 100 ml. of a solution of chloroform staturated with methylamine at 0° C. is added slowly 4 g. of 2,6-difluoro-4-nitrobenzenephosphonic dichloride to give a clear solution which is evaporated to dryness under reduced pressure. The residue is washed with water and the undissolved residue recrystallized from chloroform to give N,N'-dimethyl-P-(2',6'-difluoro-4-nitrobenzene)phosphondiamide.

EXAMPLE 19

550 mg. of N,N'-dimethyl-P-(2',6' - difluoro-4'-nitrobenzene)phosphondiamide is dissolved in 25 ml. of methanol and hydrogenated in the presence of 200 mg. of Raney nickel at a pressure 40 lb. per sq. in. After hydrogenation, the reaction mixture is filtered, concentrated, triturated with ether to give a solid residue which on recrystallization from ethanol gives N,N'-dimethyl-P-(2',6'-difluoro-4'-amino-benzene)phosphonamide.

What is claimed is:
1. A compound having the formula

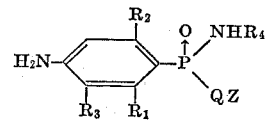

wherein $R_1$, $R_2$ and $R_3$ are hydrogen or fluoro, at least one of which is fluoro; Q is oxygen; Z is hydrogen or an alkali metal; and $R_4$ is 4-(pyrimidinylsulfamoyl) phenyl, 4-(dimethylisoxazolylsulfamoyl) phenyl, 4-thiazolylsulfamoyl) phenyl or 4-(methylpyrimidinylsulfamoyl) phenyl, and alkali metal salts thereof.

2. A compound according to claim 1 having the designation disodium N-[4-(2-pyrimidinylsulfamoyl)phenyl]-P-(4'-amino-2'-fluorobenzene)phosphonamidate.

3. A compound according to claim 1 having the designation disodium N-[4-(2-pyrimidinylsulfamoyl)phenyl]-P-(4'-amino-3'-fluorobenzene)phosphonamide.

4. A compound according to claim 1 having the designation disodium N-[4-(2-pyrimidinylsulfamoyl)phenyl]-P-(4'-amino-2',6'-difluorobenzene)phosphonamidate.

References Cited

UNITED STATES PATENTS 3,442,938   5/1969   Christensen, et al. __ 260—502.5

HENRY R. JILES, Primary Examiner

C. M. SHURKO, Assistant Examiner

U.S. Cl. X.R.

260—239.7, 239.9, 239.95, 543 P, 551 P, 944; 424—200, 211